(12) United States Patent
Yoshioka et al.

(10) Patent No.: US 9,324,124 B2
(45) Date of Patent: *Apr. 26, 2016

(54) IMAGE PROCESSING APPARATUS, METHOD, AND COMPUTER-READABLE MEDIUM FOR CONTROLLING THE DISPLAY OF AN IMAGE

(75) Inventors: Shigeatsu Yoshioka, Kanagawa (JP); Masashi Kimoto, Tokyo (JP)

(73) Assignee: Sony Corporation, Tokyo (JP)

(*) Notice: Subject to any disclaimer, the term of this patent is extended or adjusted under 35 U.S.C. 154(b) by 302 days.

This patent is subject to a terminal disclaimer.

(21) Appl. No.: 12/940,310

(22) Filed: Nov. 5, 2010

(65) Prior Publication Data

US 2011/0128367 A1 Jun. 2, 2011

(30) Foreign Application Priority Data

Nov. 30, 2009 (JP) ................................. 2009-272841

(51) Int. Cl.
*H04N 9/47* (2006.01)
*G06T 1/00* (2006.01)

(52) U.S. Cl.
CPC ........................................ *G06T 1/00* (2013.01)

(58) Field of Classification Search
CPC ..................................................... G06T 3/4023
USPC ............................................ 348/240.99, 358
See application file for complete search history.

(56) References Cited

U.S. PATENT DOCUMENTS 5,970,162 A * 10/1999 Kawashima .................. 382/103
6,101,265 A    8/2000 Bacus et al.
6,940,532 B1 * 9/2005 Fukui et al. ................... 715/784
7,933,473 B2 * 4/2011 Gerhard et al. ............... 382/305
2004/0167806 A1    8/2004 Eichhorn et al.

(Continued)

FOREIGN PATENT DOCUMENTS

JP    05-027941    2/1993
JP    2005-100199    4/2005

(Continued)

OTHER PUBLICATIONS

European Search Report for Application 10014904.6-2218 dated May 16, 2011.

(Continued)

*Primary Examiner* — Dave Czekaj
*Assistant Examiner* — Leron Beck
(74) *Attorney, Agent, or Firm* — K&L Gates LLP (57) ABSTRACT

In one example embodiment, an information processing apparatus displays a first image associated with an observation target object. In this example embodiment, the first image has a first zoom magnification and a first display range which has a first center position. In one example embodiment, the information processing apparatus enables a user to change the first zoom magnification by selecting a first position of the displayed first image. In response to the first position being selected, the information processing apparatus displays a second image associated with the observation target image. In this example embodiment, the second image has a second zoom magnification which is different from the first zoom magnification. The second image also has a second display range which has a second center position which is different from the first center position. In this example embodiment, the second center position corresponds to the selected position.

21 Claims, 9 Drawing Sheets

(56) References Cited

U.S. PATENT DOCUMENTS

| | | |
|---|---|---|
| 2005/0027705 A1* | 2/2005 | Sadri et al. .................. 707/5 |
| 2005/0041044 A1 | 2/2005 | Gannon |
| 2007/0025713 A1* | 2/2007 | Hosono ...................... 396/72 |
| 2008/0158394 A1* | 7/2008 | Kim ..................... 348/240.99 |
| 2008/0204476 A1 | 8/2008 | Montague |
| 2009/0153478 A1* | 6/2009 | Kerr et al. .................. 345/158 |
| 2010/0053377 A1* | 3/2010 | Yanai ...................... 348/240.2 |
| 2012/0062598 A1* | 3/2012 | Furuya et al. ............... 345/651 |

FOREIGN PATENT DOCUMENTS

| | | |
|---|---|---|
| JP | 2005-530225 | 10/2005 |
| JP | 2007-265151 | 10/2007 |
| JP | 2009-37250 | 2/2009 |
| JP | 2009-037250 | 2/2009 |

OTHER PUBLICATIONS

Zooming Internet Citation, Anonymous, Jun. 4, 2001, XP002338343, URL:http://www.glue.umd.edu/{pkd/imagine/viewer/viewer_zooming.htm, retrieved Jul. 14, 2005.

Shawn Mikula et al., "Internet-enabled high-resolution brain mapping and virtual microscopy," NeuroImage, vol. 35, 2007, pp. 9-15. (7 pages).

Japanese Patent Office, Office Action issued in connection with Japanese Patent Application No. 2009-272841, dated Jun. 4, 2013. (3 pages).

European Patent Office, Communication pursuant to Article 94(3) issued in connection with European Patent Application No. 10 014 904.6, dated May 17, 2013. (7 pages).

Japanese Office Action issued Aug. 20, 2013 for corresponding Japanese Appln. No. 2009-272841.

* cited by examiner

IMAGE PROCESSING APPARATUS, METHOD, AND COMPUTER-READABLE MEDIUM FOR CONTROLLING THE DISPLAY OF AN IMAGE

CROSS REFERENCES TO RELATED APPLICATIONS

The present application claims priority to Japanese Patent Application No. JP 2009-272841, filed in the Japanese Patent Office on Nov. 30, 2009, the entire contents of which is being incorporated herein by reference.

BACKGROUND

In a field of medicine, pathology, or the like, there has been proposed a system that digitizes an image of a cell, a tissue, an organ, or the like of a living body, that is obtained by an optical microscope, to examine the tissue or the like by a doctor or a pathologist or diagnose a patient based on the digitized image.

For example, Japanese Patent Application Laid-open No. 2009-37250 (hereinafter, referred to as Patent Document 1) discloses a method in which an image optically obtained by a microscope is digitized by a video camera with a CCD (charge coupled device), a digital signal is input to a control computer system, and the image is visualized on a monitor. A pathologist performs examination while watching the image displayed on the monitor (see, for example, paragraphs [0027] and [0028] and FIG. 5 of Patent Document 1).

In the case where a digital pathological image is displayed on a monitor of a computer system to perform a pathological diagnosis, a person who gives a diagnosis (hereinafter, referred to as "operator") uses an operation means such as a mouse and a keyboard to shift or perform zoom-in or zoom-out on an observation position of the digital pathological image on the screen of the monitor. In response to a command of the movement or the zoom-in or zoom-out that is input from the operation means when the operator operates the operation means, a program of processing a browse of the digital pathological image performs a display processing in accordance with the command.

A typical program performs processing of the zoom-in or zoom-out of an image with the center of the image displayed on the screen being set as a reference. For this reason, in the case where a region of a part of the image displayed is intended to be observed in detail by performing the zoom-in, the operator first has to input, using the operation means, a command for shifting the desired region of the image displayed to approximately the center of the screen, and input a command for performing the zoom-in on the region using the operation means upon completion of the shift. In this way, a plurality of operation steps are needed, which is a factor of deterioration of the operation efficiency. In particular, in the case where a part that is necessary to be observed is located around a corner, there is fear that the part that is necessary to be observed may be outside the screen due to the zoom-in operation, and the operator misses a part that is necessary to be observed. In such a case, the operator has to find again the part that is necessary to be observed by shifting a display range of the image, for example, with the result that the deterioration of the operation efficiency is caused.

Further, in the typical program, processing of shifting the display range of the image with respect to a dragging operation of a mouse is allocated in many cases. However, in this system of shifting the display range of the image by the dragging operation of the mouse, the shift of the display range of the image is limited up to a position of the end of the screen to which a cursor pointer can be moved. To display a further display range, it is necessary to input a command assigned to an operation other than the dragging of the mouse, which also deteriorates the operation efficiency.

In view of the above-mentioned circumstances, it is desirable to provide an information processing apparatus, a method, and a computer-readable medium capable of desirably performing observation of an image through a change in zoom magnification for display.

SUMMARY

The present disclosure relates to an information processing apparatus, a method, and a computer-readable medium for controlling the display of an image obtained by a microscope in the field of medicine, pathology, biology, materials science, or the like.

In one example embodiment, an information processing apparatus includes a processor, a display device operatively coupled to the processor, an input device operatively coupled to the processor, and a memory device operatively coupled to the processor, the memory device storing instructions that cause the processor, in cooperation with the display device, the input device and the memory device, to: (a) display a first image associated with an observation target object (e.g., a section of biological tissue), the first image having: (i) a first zoom magnification; and (ii) a first display range having a first center position; (b) enable a user to change the first zoom magnification by selecting a first position of the displayed first image; and (c) in response to the first position being selected, display a second image associated with the observation target image, the second image having: (i) a second zoom magnification which is different from the first zoom magnification; and (ii) a second display range having a second center position which is different from the first center position, the second center position corresponding to the selected position.

In one example embodiment, the displayed first image is observed by a microscope.

In one example embodiment, the instructions cause the processor to operate with the input device to enable the user to select the first position of the displayed first image using a displayed cursor pointer. In one example embodiment, when the first position is selected, a second position of the displayed cursor pointer corresponds to the selected first position. In one example embodiment, the instructions cause the processor to operate with the display device to, in response to the first position being selected, display the cursor pointer at the second center position.

In one example embodiment, the instructions cause the processor to operate with the display device to, before the second image is displayed, display a third image. In one example embodiment, the third image has a third zoom magnification which is different from the first zoom magnification and the second zoom magnification. In this example embodiment, the third image has a third display range having a third center position which is different from the first center position and the second center position.

In one example embodiment, the displayed third image includes a third position which corresponds to the selected first position of the first image. In this example embodiment, a first distance between the third position and the third center position is smaller than a second distance between the selected first position and the first center position. In one example embodiment, the instructions cause the processor to operate with the display device to display a cursor pointer at the third position.

In one example embodiment, the information processing apparatus operates using a first mode. In this example embodiment, the instructions cause the processor to operate with the input device to: (i) enable the user change the operation of the information processing apparatus from the first mode to a second, different mode; and (ii) in response to the user changing the operation of the information processing apparatus to the second, different mode, and in response to the position being selected, display a fourth image associated with the observation target image. In one example embodiment, the fourth image has a fourth zoom magnification which is different from the first zoom magnification. The fourth image also has a fourth display range having a fourth center position which corresponds to the first center position.

In one example embodiment, the instructions cause the processor to: (a) after the second image is displayed, enable the user to change the second zoom magnification by zooming out; and (b) in response to the to second zoom magnification being changed by zooming out, display a fifth image having a fifth display range having a fifth center position which corresponds to the second center position.

In one example embodiment, a method of operating an information processing apparatus including instructions includes causing a processor to execute the instructions to operate with a display device to display a first image associated with an observation target object (e.g., a section of biological tissue). In one example embodiment, the first image has a first zoom magnification and a first display range having a first center position. In one example embodiment the method includes causing the processor to execute the instructions to operate with an input device to enable a user to change the first zoom magnification by selecting a first position of the displayed first image. In one example embodiment, the method includes, in response to the first position being selected, causing the processor to execute the instructions to operate with the display device to display a second image associated with the observation target image. In one example embodiment, the second image has: (i) a second zoom magnification which is different from the first zoom magnification; and (ii) a second display range having a second center position which is different from the first center position. In one example embodiment, the second center position corresponds to the selected position.

In one example embodiment, the displayed first image is observed by a microscope.

In one example embodiment, the method includes causing the processor to execute the instructions to operate with the input device to enable the user to select the first position of the displayed first image using a displayed cursor pointer.

In one example embodiment, when the first position is selected, a second position of the displayed cursor pointer corresponds to the selected first position.

In one example embodiment, the method includes, in response to the first position being selected, causing the processor to execute the instructions to operate with the display device to display the cursor pointer at the second center position.

In one example embodiment, the method includes causing the processor to execute the instructions to operate with the display device to, before the second image is displayed, display a third image having: (a) a third zoom magnification which is different from the first zoom magnification and the second zoom magnification; and (b) a third display range having a third center position which is different from the first center position and the second center position. In one example embodiment, the displayed third image includes a third position which corresponds to the selected first position of the first image. In this example embodiment, a first distance between the third position and the third center position is smaller than a second distance between the selected first position and the first center position. In one example embodiment, the method includes causing the processor to execute the instructions to operate with the display device to display a cursor pointer at the third position.

In one example embodiment, the information processing apparatus operating using a first mode. In one example embodiment, the method includes causing the processor to execute the instructions to operate with the input device to: (i) enable the user change the operation of the information processing apparatus from the first mode to a second, different mode; and (ii) in response to the user changing the operation of the information processing apparatus to the second, different mode, and in response to the position being selected, display a fourth image associated with the observation target image. In this example embodiment, the fourth image has a fourth zoom magnification which is different from the first zoom magnification. In this example embodiment, the fourth image also has a fourth display range having a fourth center position which corresponds to the first center position.

In one example embodiment, the method includes causing the processor to execute the instructions to operate with the input device to, after the second image is displayed, enable the user to change the second zoom magnification by zooming out. In one example embodiment, the method includes, in response to the to second zoom magnification being changed by zooming out, causing the processor to execute the instructions to operate with the display device to display a fifth image having a fifth display range having a fifth center position which corresponds to the second center position.

In one example embodiment, a computer-readable medium stores instructions structured to cause an information processing apparatus to display a first image associated with an observation target object. In this example embodiment, the first image has (i) a first zoom magnification; and (iii) a first display range having a first center position. In one example embodiment, the instructions are further structured to cause the information processor apparatus to (a) enable a user to change the first zoom magnification by selecting a position of the displayed first image; and (c) in response to the position being selected, display a second image associated with the observation target image. In this example embodiment, the second image has: (i) a second zoom magnification which is different from the first zoom magnification; and (ii) a second display range having a second center position which is different from the first center position. In one example embodiment, the second center position corresponds to the selected position.

As described above, according to the embodiments of the present disclosure, the image can be desirably observed through the change the zoom magnification of the display.

Additional features and advantages are described herein, and will be apparent from the following Detailed Description and the figures.

BRIEF DESCRIPTION OF THE FIGURES

FIG. 1 is a block diagram showing the structure of an example computer system including at least an information processing apparatus according to an example embodiment of the present disclosure.

DETAILED DESCRIPTION

Hereinafter, example embodiments of the present disclosure will be described with reference to the drawings.

[Structure of Information Processing Apparatus]

Figure 1:
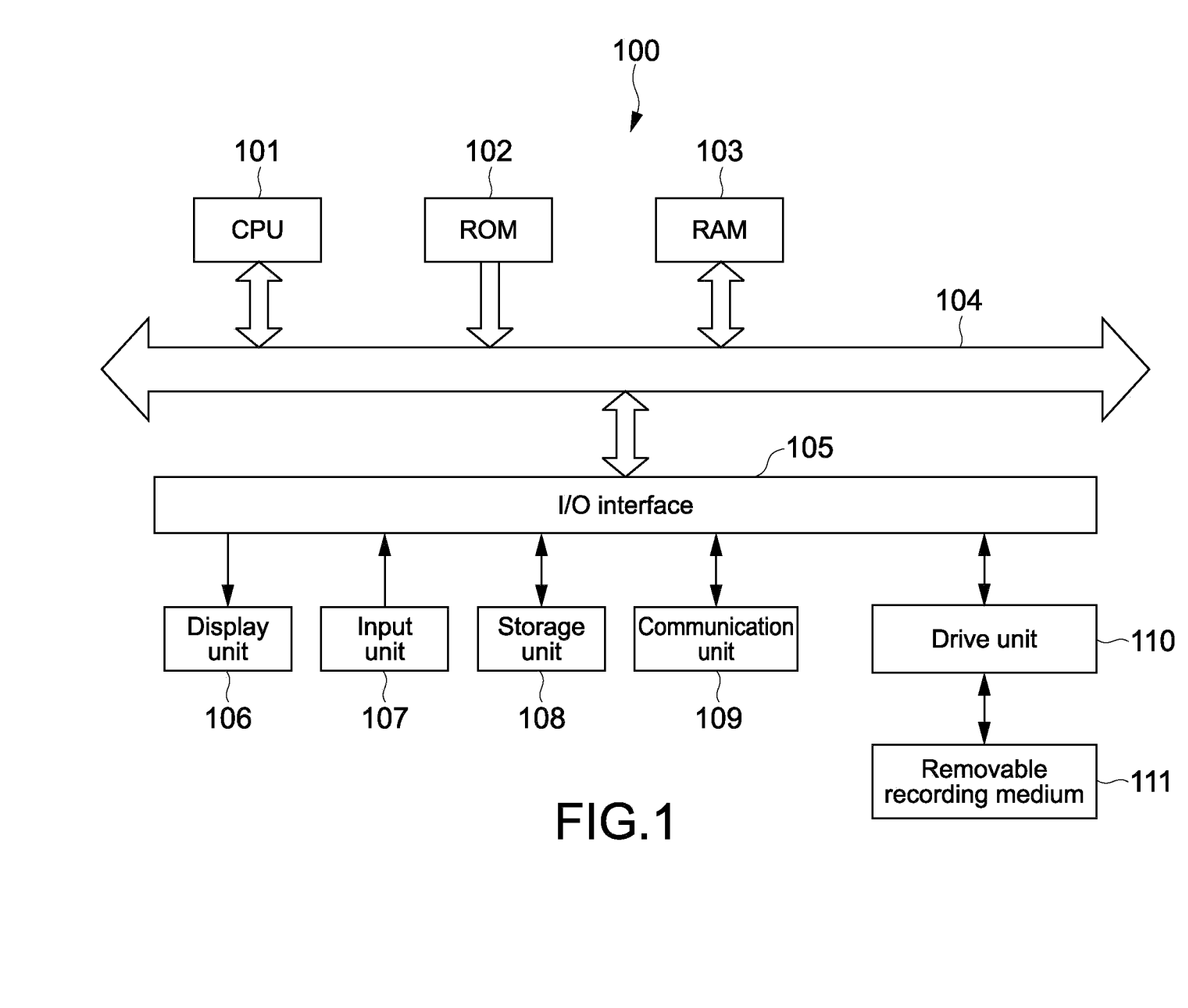
FIG. 1 is a diagram showing the outline of an example image processing system according to an example embodiment of the present disclosure.

FIG. 1 is a block diagram showing the structure of an example computer system including at least an information processing apparatus according to an example embodiment of the present disclosure. As the information processing apparatus, a PC (personal computer) 100 is used, for example.

The PC 100 includes a CPU (central processing unit) 101, a ROM (read only memory) 102, a RAM (random access memory) 103, an input and output interface (hereinafter, abbreviated as I/O interface) 105, and a bus 104 that connects those components with one another.

To the I/O interface 105, a display unit 106, an input unit 107, a storage unit 108, a communication unit 109, a drive unit 110, and the like are connected.

The display unit 106 is a display device that uses liquid crystal, EL (electro-luminescence), a CRT (cathode ray tube), or the like.

The input unit 107 is, for example, a pointing device, a keyboard, a touch panel, or another operation apparatus. In the case where the input unit 107 includes a touch panel, the touch panel may be integrated with the display unit 106.

The storage unit 108 is a non-volatile memory such as an HDD (hard disk drive), a flash memory, and another solid-state memory.

The drive unit 110 is a device capable of driving a removable recording medium 111 such as an optical recording medium, a floppy (registered trademark) disk, a magnetic recording tape, and a flash memory. In contrast, the storage unit 108 is often used as a device that is previously included in the PC 100 and mainly drives a recording medium that is not removable.

The communication unit 109 is a modem, a router, or another communication apparatus that is connectable to a LAN (local area network), a WAN (wide area network), or the like and is used for communicating with another device. The communication unit 109 may perform either one of a wired communication or a wireless communication. The communication unit 109 is used separately from the PC 100 in many cases.

[Pyramid Structure of Image Data and Access to Image Data]

Next, a description will be given on image data as a target of a display processing performed by the information processing apparatus (PC 100) of this example embodiment.

Figure 2:
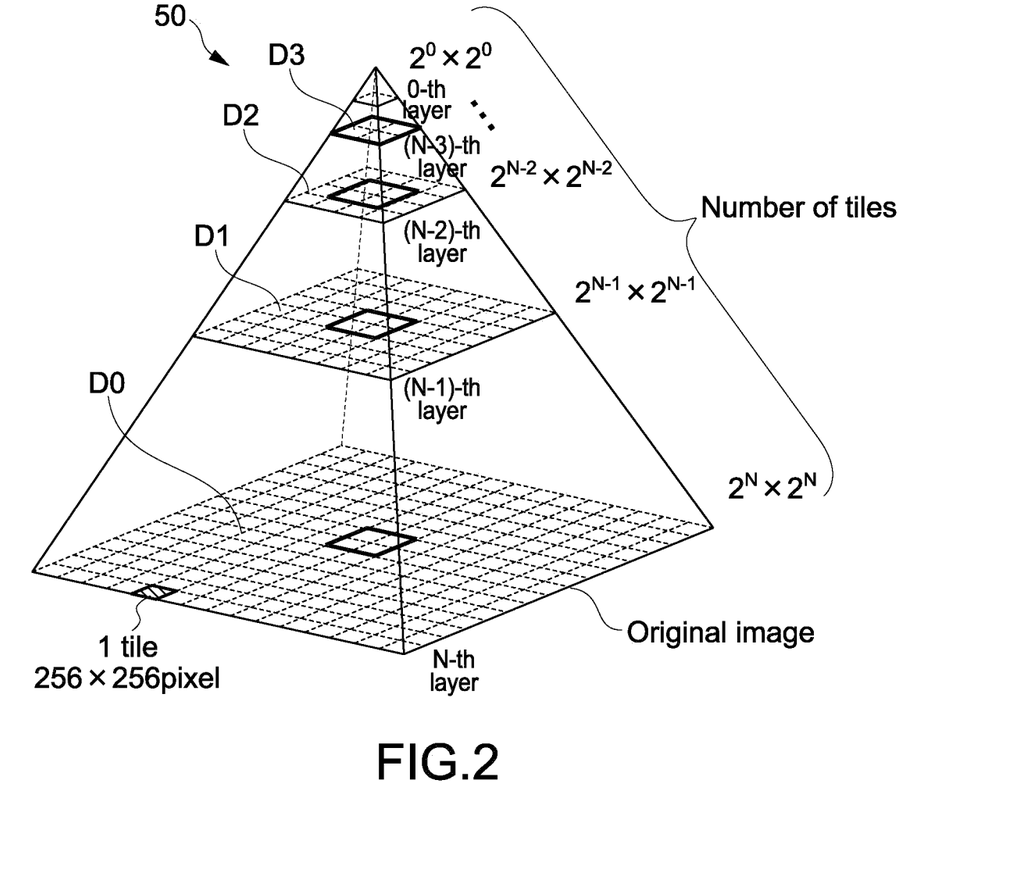
FIG. 2 is a diagram showing an example image pyramid structure of image data.

FIG. 2 is a diagram showing a pyramid structure of the image data.

As shown in FIG. 2, target image data has a pyramid structure of image data obtained by picking up an image of an observation target object using an image pickup means of a high resolution. The pyramid structure of the image data refers to a structure in which a plurality of pieces of the image data at a plurality of resolutions obtained by reducing a resolution of an original image data stepwise are generated and set in a layered manner. The image data in each layer is divided into regions called "tiles" at a predetermined resolution. If the layers of the pyramid structure are represented by an N-th layer, an (N−1)-th layer, an (N−2)-th layer, ..., a 0-th layer from the bottom, the numbers of tiles of the layers are determined to be $2^N*2^N$, $2^{N-1}*2^{N-1}$, $2^{N-2}*2^{N-2}$, ..., 1, respectively. It should be noted that the resolution of one tile is 256×256 (pixel) or 256×512 (pixel), for example.

[Access to Image Data from Image Pyramid Structure]

When receiving a specification of an arbitrary resolution and a display range of an image by a user, the information processing apparatus (PC 100) of this example embodiment reads corresponding image data from among the image pyramid structure by the tile, buffers the data read in a display-purpose buffer, and displays an image on the display unit 106. In addition, in the case where the user gives an instruction for shifting the display range of the image displayed on the display unit 106, the information processing apparatus (PC 100) reads image data of a shift destination from among the image data items at the same resolution by the tile in accordance with the instruction and updates the content of the display-purpose buffer, thereby displaying the image of the shift destination on the display unit 106. It should be noted that the "display range of the image" refers to a region of image data that is actually displayed on a physical screen in an entire image data. Further, in the case where the user gives an instruction for changing a zoom magnification (performing zoom-in or zoom-out) for the display, the information processing apparatus (PC 100) reads necessary image data by the tile from among image data items at a resolution corresponding to the zoom magnification specified and updates the content of the display-purpose buffer, thereby changing the zoom magnification of the display image. It should be noted that in the case where the size of an image display range in the physical image is set to be constant, when the zoom magnification is increased (when the zoom-in operation is performed), the display range of the image is reduced, while when the zoom magnification is decreased (when the zoom-out operation is performed), the display range of the image is increased. By reading the necessary image data from the pyramid structure of the image data by the tile as described above, the total access time to the image data can be saved.

[Change in Zoom Magnification]

Next, a description will be given on the change in zoom magnification (zoom-in or zoom-out). The description is given with the assumption that the display range of the image has the size of 2×2 tiles.

Figure 3:
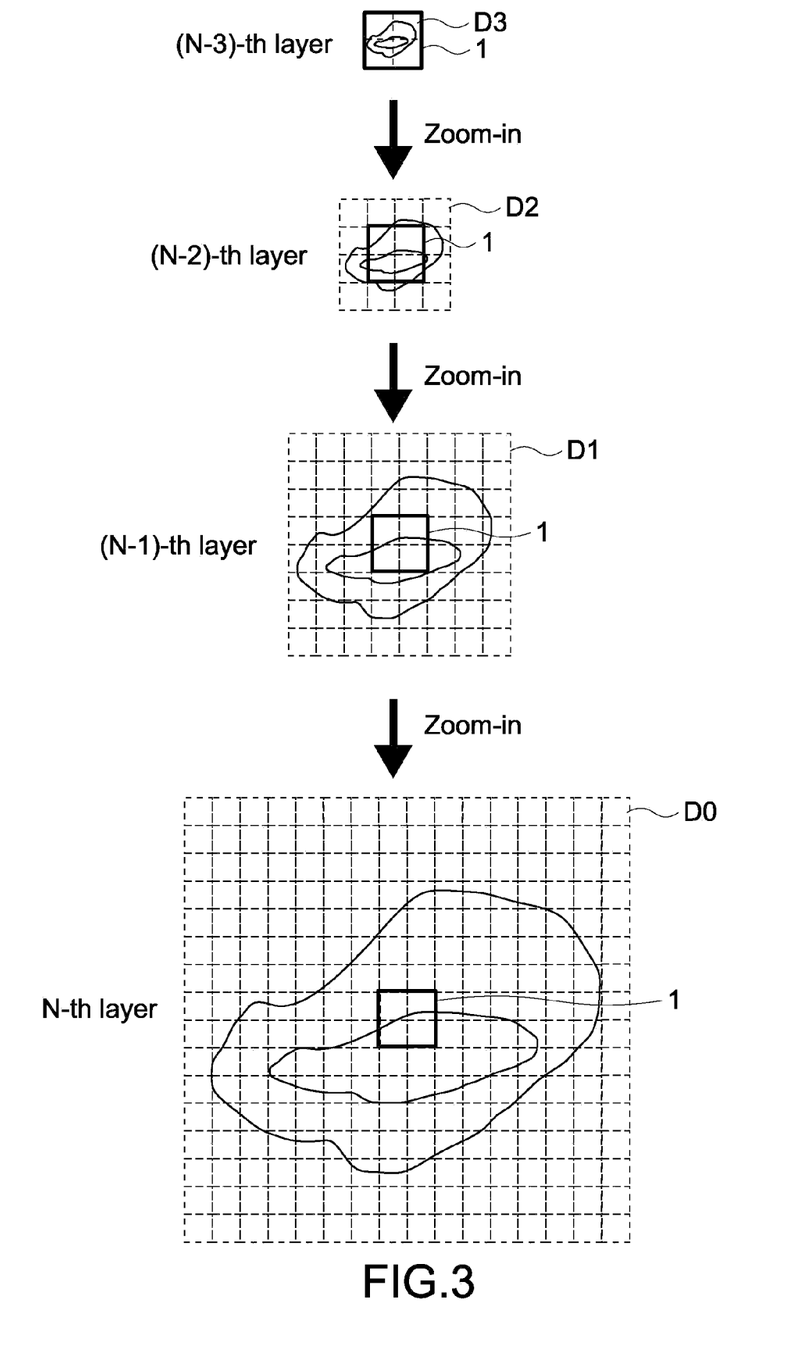
FIG. 3 is a diagram showing a relationship between the image pyramid structure and a change in zoom magnification of an example display image in a center fixation mode.

FIG. 3 is a diagram showing a relationship between the image pyramid structure and the change in the zoom magnification of the display image. In FIG. 3, image data D3 on an (N−3)-th layer is constituted of 2×2 tiles, which is the same size as the display range of the image. Therefore, the entire image thereof is displayed on the physical screen as the display range. When the zoom magnification is increased by one level from such a state, a region of the 2×2 tiles in image data D2 that is constituted of 4×4 tiles on the (N−2)-th layer corresponds to a display range 1 of the image. As a result, the image is displayed at 2× zoom. When the zoom magnification is further increased by one level, a region of the 2×2 tiles in image data D1 that is constituted of 8×8 tiles on the (N−1)-th layer corresponds to the display range 1 of the image. As a result, the image is displayed at 4× zoom. When the zoom magnification is further increased by one level, a region of the 2×2 tiles in image data D0 that is constituted of 16×16 tiles on the N-th layer corresponds to the display range 1 of the image. As a result, the image is displayed at 8× zoom. The same holds true for the case of the zoom-out. As described above, when the zoom magnification is changed, the resolution is changed, with the result that the display range 1 of the image, that is, the image from the viewpoint of the user is changed.

[Two Modes for Changing Image Display Range with Zoom Magnification Change]

Figure 6:
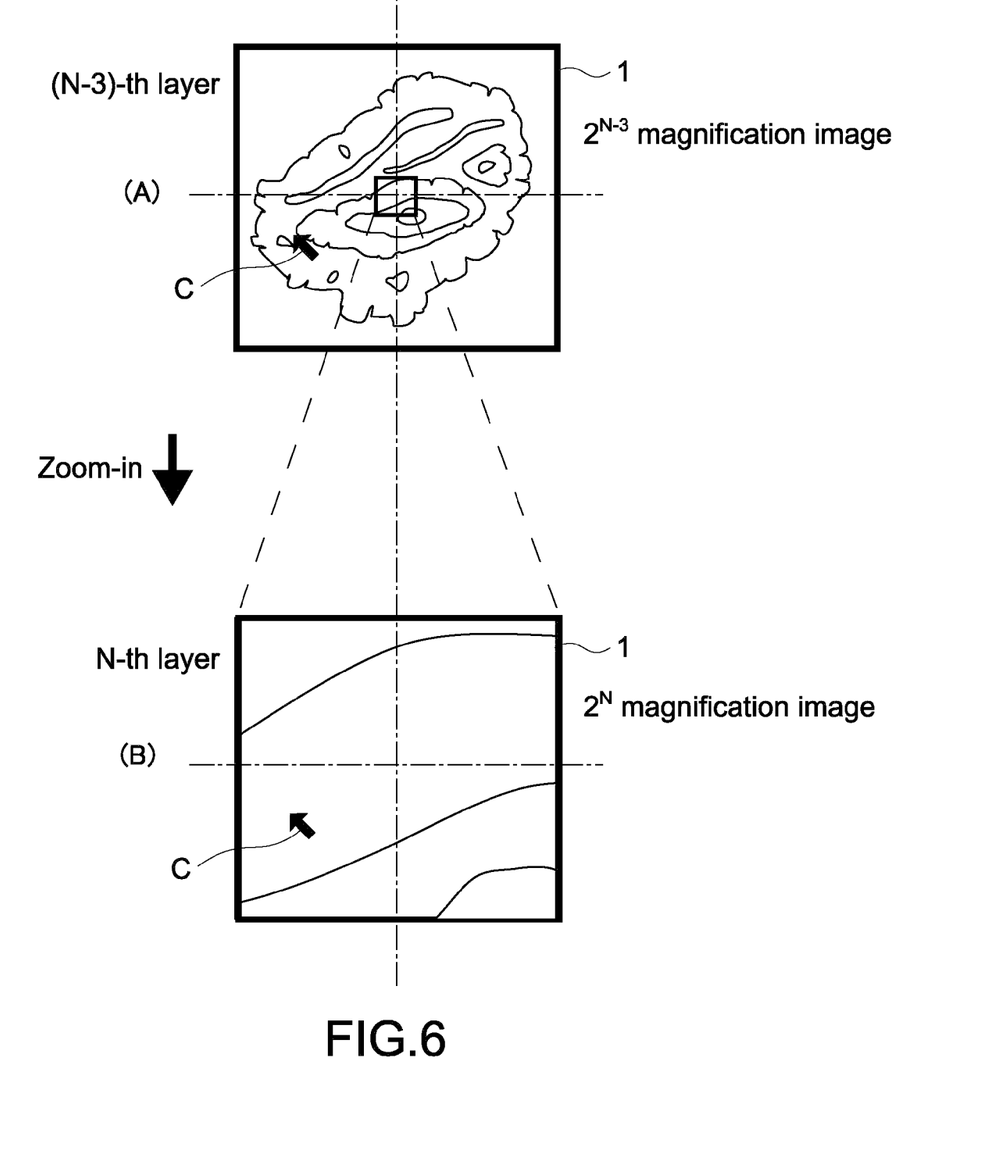
FIG. 6 is a diagram for explaining an example zoom-in in the center fixation mode.
Figure 7:
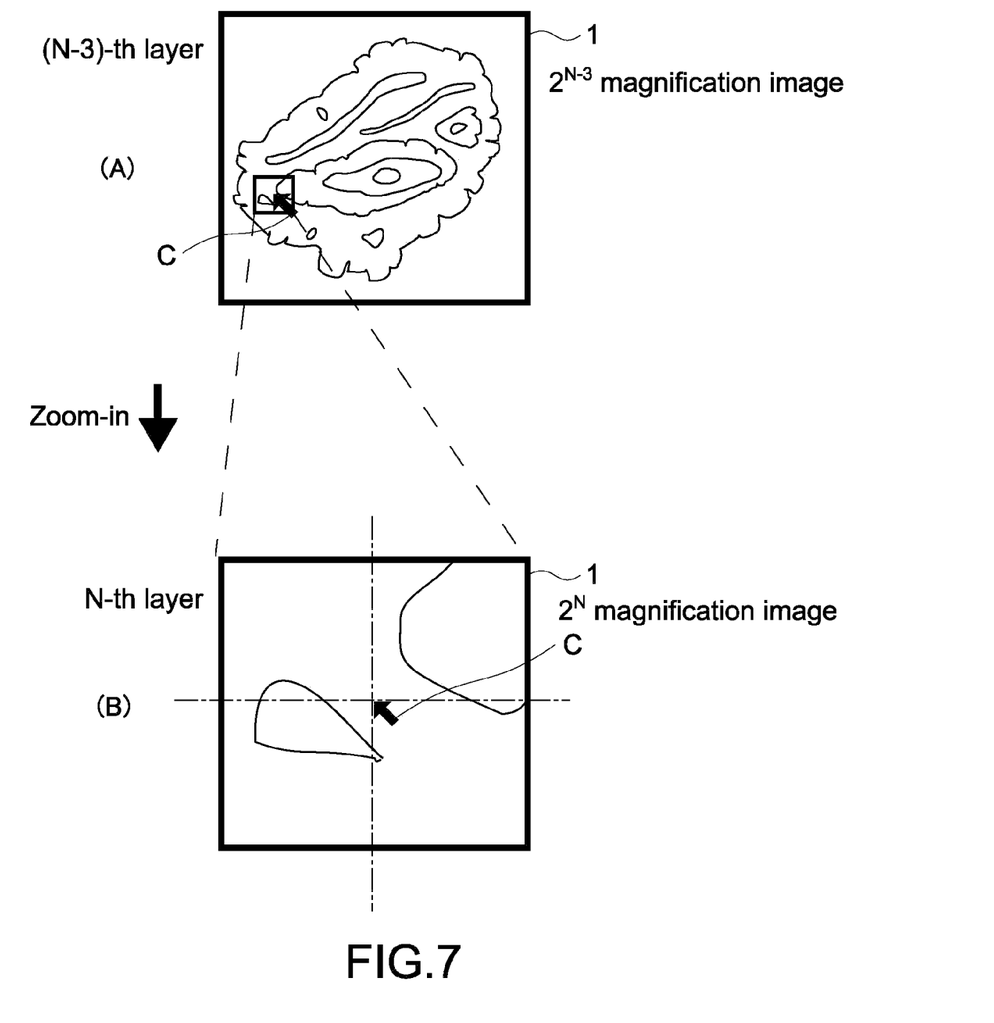
FIG. 7 is a diagram for explaining an example zoom-in in the center variability mode.

For the information processing apparatuses (PC 100) of this example embodiment, two modes are prepared as methods of changing the display range 1 of the image with the change in the zoom magnification. One is a "center fixation mode", and the other is a "center variability mode". As shown in FIGS. 3 and 6, in the center fixation mode, the center position of the display range 1 in a coordinate space of the original image (image data on the N-th layer) is not varied before and after the change in the zoom magnification. In contrast, as shown in FIGS. 4 and 7, in the center variability mode, the center position of the display range 1 in the coordinate space of the original image is varied before and after the change in the zoom magnification.

Figure 4:
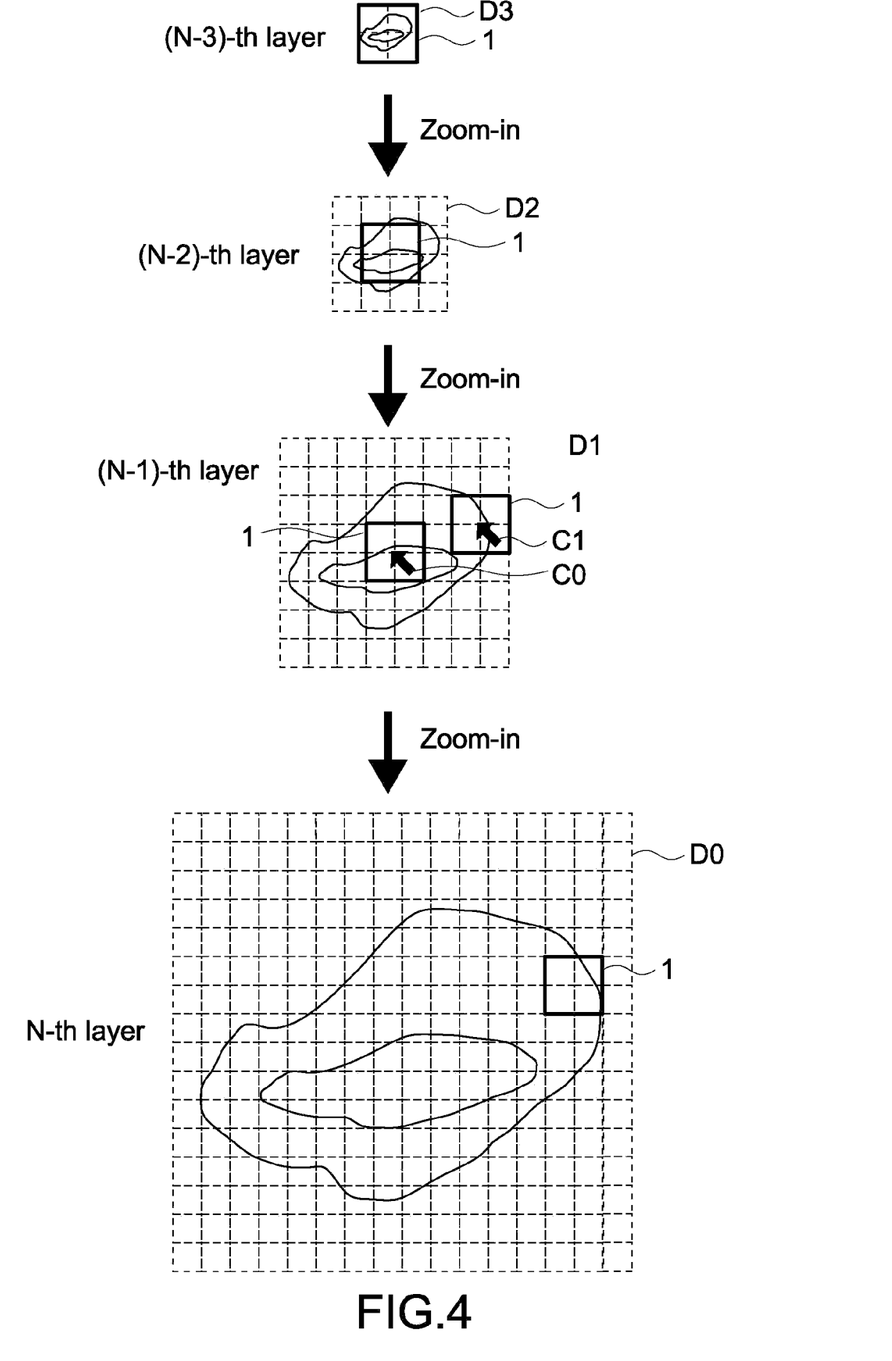
FIG. 4 is a diagram showing a relationship between the image pyramid structure and the change in the zoom magnification of the example display image in a center variability mode.

More specifically, in the center variability mode, as shown in FIG. 4, the display range 1 of the image is changed with the change in the zoom magnification so that the coordinates corresponding to a position on the screen that is indicated by a cursor pointer C1 before the change in the zoom magnification in the coordinate space of the original image is coincided with the center position of the display image after the change in the zoom magnification. It should be noted that FIG. 4 shows the case where the cursor pointer on the screen is shifted from a position of C0 to the position of C1 in the state where the image data of the (N−1)-th layer is displayed, and then the instruction of the zoom-in is given.

The two modes can be used separately as necessary based on a setting set by the user. That is, with the use of the input unit 107, the user can make a setting so that either one of the modes is effective. In response to the setting, the CPU 101 stores the content of the setting in the storage unit 108. Upon reception of the instruction for changing the zoom magnification from the user through the input unit 107, the CPU 101 performs control to change the display range of the image in either of the two modes described above in accordance with the content of the setting stored in the storage unit 108.

[Functional Structure to Change Image Display Range with Zoom Magnification Change]

Figure 5:
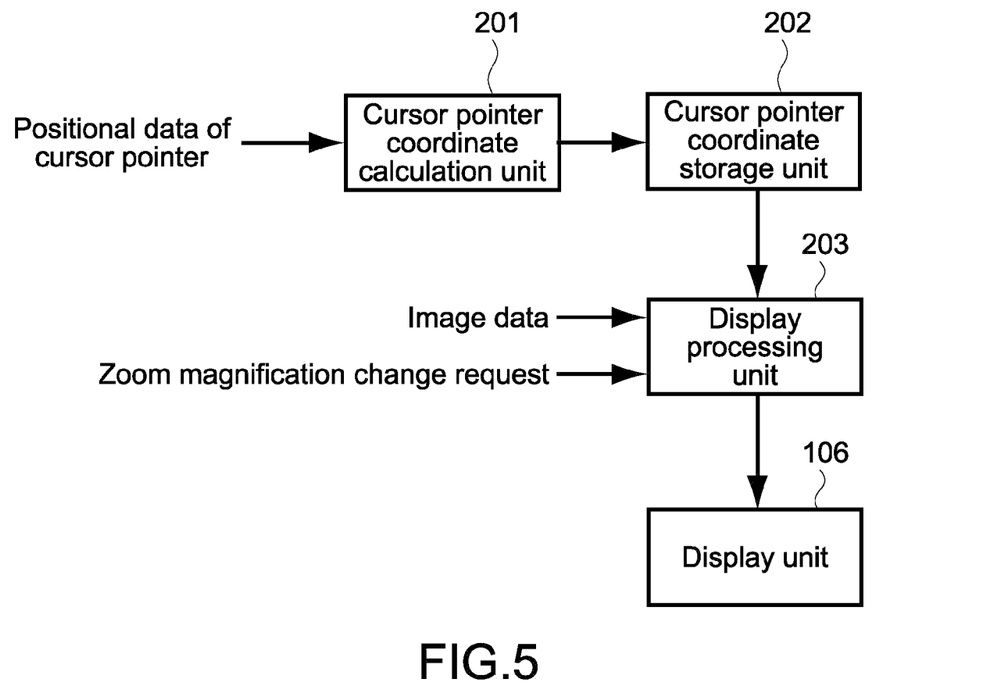
FIG. 5 is a diagram showing a functional structure for changing an image display range with the change in the zoom magnification in an example information processing apparatus according to an example embodiment.

FIG. 5 is a diagram showing a functional structure for changing the image display range with the change in the zoom magnification.

As shown in FIG. 5, the information processing apparatus (PC 100) of this example embodiment includes a cursor pointer coordinate calculation unit 201, a cursor pointer coordinate storage unit 202, and a display processing unit 203, as the functional structure for changing the image display range with the change in the zoom magnification. Those functional units are provided as a program for causing the typical computer as described above to function. The program is stored in the storing means such as the storage unit 108, and the CPU 101 loads the program from the storage unit 108 to the RAM (random access memory) 103 as the main memory in order to display the image data on the display unit 106, and interprets and executes the program. The functional units are as follows.

In the center variability mode, the cursor pointer coordinate calculation unit 201 calculates, based on the positional data of a cursor pointer on the screen, the coordinates in the original image coordinate space that are indicated by the cursor pointer.

The cursor pointer coordinate storage unit 202 stores the latest coordinate data of the cursor pointer which is calculated by the cursor pointer coordinate calculation unit 201.

Upon input of a zoom magnification change request including a value of a zoom magnification of a change destination using the input unit 107 by the user, the display processing unit 203 changes the zoom magnification of the display image in accordance with a preset mode (center fixation mode or center variability mode). Specifically, in the case where the center fixation mode is set, as shown in FIG. 6, the display processing unit 203 changes the zoom magnification without changing the coordinates of the center in the original image coordinate space of the display image before and after the change of the zoom magnification. On the other hand, in the case where the center variability mode is set, as shown in FIG. 7, the display processing unit 203 obtains, from the cursor pointer coordinate storage unit 202, the coordinate data of the original image coordinate space corresponding to a position on the screen that is indicated by a cursor pointer C and changes the zoom magnification so that the coordinates are coincided with the center position of the display image after the change in the zoom magnification.

[Operation of Changing Zoom Magnification in Center Variability Mode]

Figure 8:
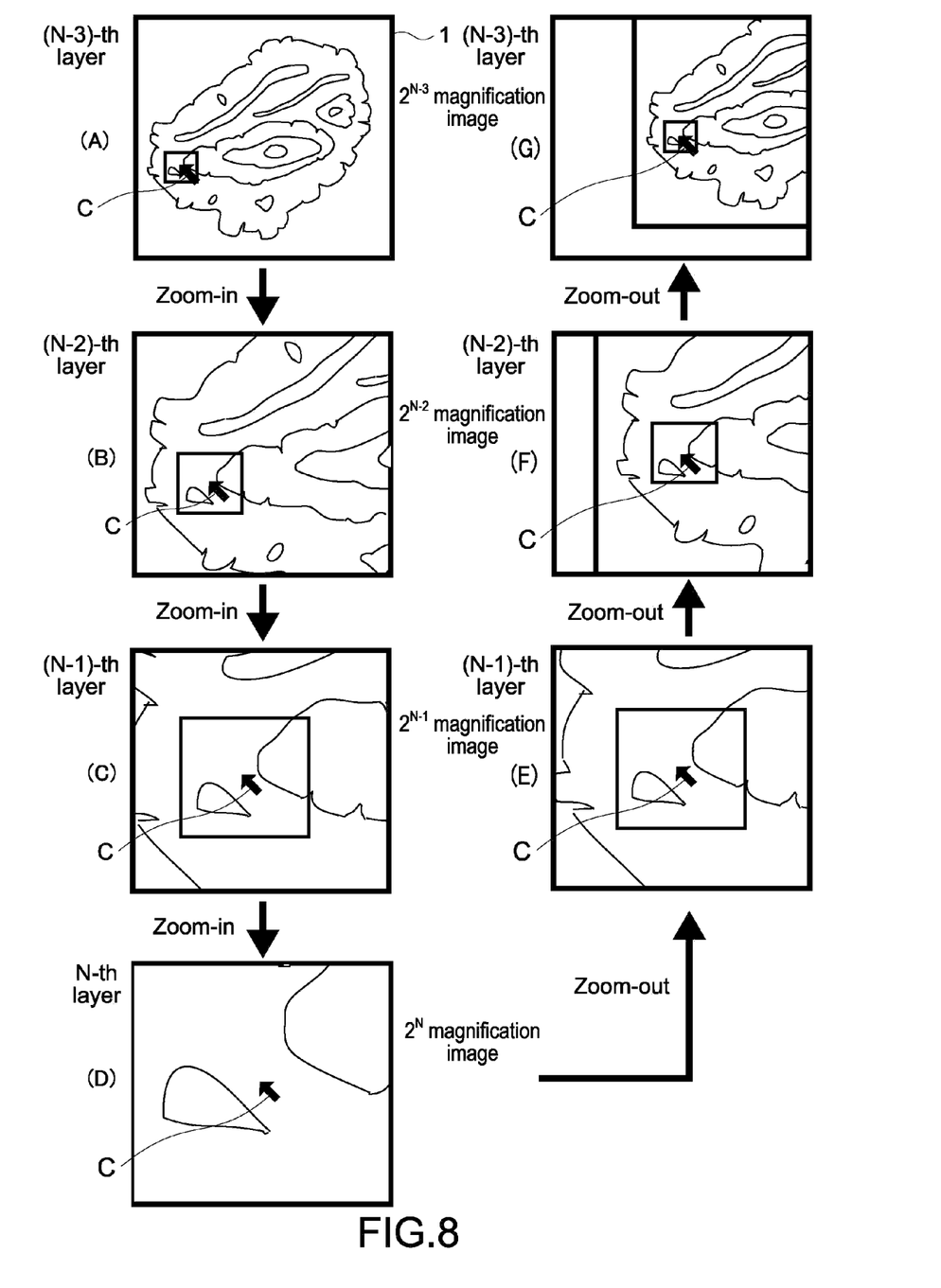
FIG. 8 is a diagram showing a state where the example display image is changed in the center variability mode.

FIG. 8 is a diagram showing a state where the zoom magnification is changed (zoom-in operation is performed) in the center variability mode.

In the figure, (A) is set as a display image before the change in the zoom magnification. The display image is based on the image data D3 of the 2×2 tiles on the (N−3)-th layer in the image data block structure. On the screen of the display unit 106 on which the display image is displayed, the cursor pointer C is displayed. The cursor pointer C can be moved in any direction by any distance on the screen by operating a mouse or the like by the user.

Here, the assumption is made that the cursor pointer C is operated by the user using the mouse or the like and is moved to a position shown in (A) of FIG. 8. In this state, if the user operates the mouse or the like to give an instruction for performing the zoom-in on the image on the N-th layer, the state of the image display is shifted from the state of the image display on the (N−3)-th layer shown in (A) of FIG. 8, through the state of an image display on the (N−2)-th layer shown in (B) of FIG. 8 and the state of an image display on the (N−1)-th layer shown in (C) of FIG. 8, to the state of an image display on the N-th layer shown in (D) of FIG. 8. Here, the center position of the display image in the image display state on the N-th layer corresponds to the coordinates in the original image coordinate space that are indicated by the cursor pointer C at the time when the zoom-in instruction is given in the image display state on the (N−3)-th layer.

As described above, in the case where there is another layer of a different resolution between the layer of a resolution corresponding to the original zoom magnification and the layer of a resolution corresponding to the target zoom magnification instead of changing to the image display state at the target zoom magnification in one go, the shift to the image display state at the target zoom magnification is carried out through the display image at the zoom magnification corresponding to the in-between layer.

Further, at this time, from the image display at the resolution corresponding to the original zoom magnification to the image display at the resolution corresponding to the target zoom magnification, the display processing unit 203 changes the display ranges of the images at the respective resolutions so that the center positions of the display images at the resolutions gradually get close to the coordinates in the original image coordinate space that are indicated by the cursor pointer C in the image display state at the resolution corresponding to the original zoom magnification.

When an instruction is given for performing the zoom-out from the image display state on the N-th layer shown in (D) of FIG. 8 to the image on the (N−3)-th layer by operating the mouse or the like by the user, the image display state is shifted from the image display state on the N-th layer shown in (D) of FIG. 8, through the image display state on the (N−1)-th layer shown in (E) of FIG. 8 and the image display state on the (N−2)-th layer shown in (F) of FIG. 8, to the image display state on the (N−3)-th layer shown in (G) of FIG. 8. As described above, in the case of the zoom-out, as in the case of the zoom-in, if there is another layer between the layer at the resolution corresponding to the original zoom magnification and the layer at the resolution corresponding to the target zoom magnification, the shift to the image display state at the target zoom magnification is carried out through the image display at the zoom magnification corresponding to the in-between layer. In addition, in the case of the zoom-out, from the image display at the resolution corresponding to the original zoom magnification to the image display at the resolution corresponding to the target zoom magnification, the display processing unit 203 also changes the display ranges of the images at the resolutions so that the center positions of the display images at the respective resolutions gradually get close to the coordinates in the original image coordinate space that are indicated by the cursor pointer C in the image display state at the resolution corresponding to the original zoom magnification.

As a result, the zoom-in display and the zoom-out display are implemented in a visually natural manner. Further, according to this example embodiment, in the case where the operator shifts the cursor pointer C to the part that is necessary to be observed in the image and then inputs the instruction for the zoom-in, the display image is changed to one at a higher resolution step by step and displayed. As a result, the fear that the operator misses the part that is necessary to be observed is reduced, which can increase the efficiency of the operation. Further, in this case, the position of the part that is necessary to be observed is moved to the center of the display image step by step, so the operator can be further prevented from missing the part that is necessary to be observed. Thus, it is possible to desirably observe the image through the change in the zoom magnification for the display.

[Shift of Display Range of Image with Mouse Dragging]

Figure 9:
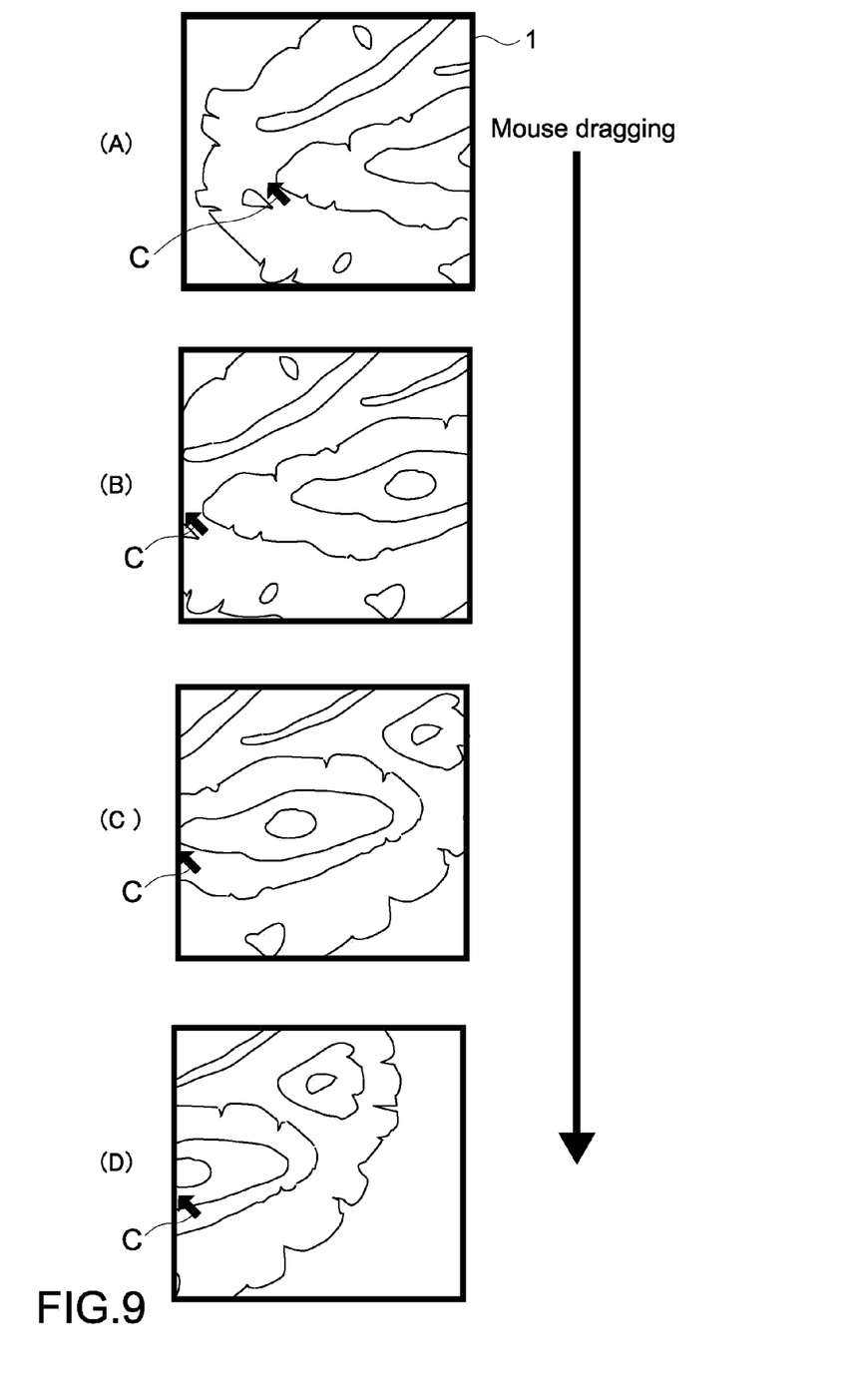
FIG. 9 is a diagram for explaining shift of the example display range with a mouse dragging operation.

The display processing unit 203 shifts the display range of the image along with the movement operation of the cursor pointer C with a mouse. At this time, the display processing unit 203 can shift the display range of the image on the basis of the output from the mouse for the movement operation of the cursor pointer C irrespective of the movable range of the cursor pointer C on the screen.

FIG. 9 is a diagram for explaining the shift of the display range of the image with the mouse dragging. In (A) to (D) of FIG. 9, the state in which the shift of the display range of the image with the mouse dragging is shown in a chronological order.

The display processing unit 203 performs processing so as to shift the display range of the image in accordance with the mouse dragging operation as follows. First, as shown in (A) of FIG. 9, the assumption is made that the cursor pointer C of the mouse is set on the display image. In this state, when the cursor pointer C is moved leftward in (A) of FIG. 9 with the mouse dragging operation, the display processing unit 203 shifts the display range of the image by the amount corresponding to the amount of movement of the cursor pointer C in the movement direction. In (B) of FIG. 9, the state is shown in which the cursor pointer C reaches the end of the display range of the screen with the mouse dragging operation. In this way, the display range of the image is shifted with the movement of the cursor pointer C with the mouse dragging operation. In the case where the operation input for moving the cursor pointer C leftward is further generated with the mouse dragging operation in the state in which the cursor pointer C reaches the end of the display range of the screen, the display processing unit 203 shifts only the display range of the image with the cursor pointer C being put on the end of the display range of the screen. In (C) and (D) of FIG. 8, the shift of the display range of the image at this time is shown.

As a result, the shift of the display range of the image with the movement operation of the cursor pointer C with the mouse dragging operation can be performed irrespective of the limitation of the movement of the cursor pointer C on the screen, which significantly improves the operability for the user.

In the example shown in FIG. 9, the description is given on the case where the cursor pointer C is moved leftward on the figure with the mouse dragging operation. Also in the case where the cursor pointer is moved in any direction on the screen, the display of the image can be performed irrespective of the limitation of the movement of the cursor pointer on the screen.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The application is claimed as follows:

1. An information processing apparatus comprising:
a processor;
a display device operatively coupled to the processor;
an input device operatively coupled to the processor; and
a memory device operatively coupled to the processor, the memory device storing instructions that cause the processor, in cooperation with the display device, the input device and the memory device, to:
  (a) display a first image associated with an observation target object, the first image having:
    (i) a first zoom magnification; and
    (ii) a first display range having a first center position;
  (b) enable a user to change the first zoom magnification by selecting a first position of the displayed first image, wherein coordinates of the selected first position are different than those of the first center position;

(c) in response to the first position being selected by the user, display a second image associated with the observation target image, the second image having:
  (i) a second zoom magnification which is different from the first zoom magnification; and
  (ii) a second display range having a second center position which is different from the first center position, wherein the second center position is based on the coordinates of the first position selected by the user using the input device, and the second center position is closer to the first position than the first center position;
(d) upon receiving a zoom-in instruction, change display ranges of images at respective resolutions so that the coordinates of the selected first position are coincided with those of a center position of the display range at a target resolution, the second image being a portion of the first image and the second display range being smaller than the first display range; and
(e) before the second image is displayed, display a third image having a third zoom magnification which is different from the first zoom magnification and the second zoom magnification and a third display range having a third center position which is different from the first center position and the second center position, wherein the displayed third image includes a third position which corresponds to the selected first position of the first image; and a first distance between the third position and the third center position is smaller than a second distance between the selected first position and the first center position.

2. The information processing apparatus of claim 1, wherein the observation target object includes a section of biological tissue.

3. The information processing apparatus of claim 1, wherein the displayed first image is observed by a microscope.

4. The information processing apparatus of claim 1, wherein the instructions, when executed by the processor, cause the processor to operate with the input device to enable the user to select the first position of the displayed first image using a displayed cursor pointer.

5. The information processing apparatus of claim 4, wherein when the first position is selected, a second position of the displayed cursor pointer corresponds to the selected first position.

6. The information processing apparatus of claim 4, wherein the instructions, when executed by the processor, cause the processor to operate with the display device to, in response to the first position being selected, display the cursor pointer at the second center position.

7. The information processing apparatus of claim 1, wherein the instructions, when executed by the processor, cause the processor to operate with the display device to display a cursor pointer at the third position.

8. The information processing apparatus of claim 1, wherein:
(a) the information processing apparatus operates using a first mode; and
(b) the instructions, when executed by the processor, cause the processor to operate with the input device to:
  (i) enable the user to change the operation of the information processing apparatus from the first mode to a second, different mode; and
  (ii) in response to the user changing the operation of the information processing apparatus to the second, different mode, and in response to the position being selected, display a fourth image associated with the observation target image, the fourth image having:
    (A) a fourth zoom magnification which is different from the first zoom magnification; and
    (B) a fourth display range having a fourth center position which corresponds to the first center position.

9. The information processing apparatus of claim 1, wherein the instructions, when executed by the processor, cause the processor to:
(a) after the second image is displayed, enable the user to change the second zoom magnification by zooming out; and
(b) in response to the to second zoom magnification being changed by zooming out, display a fifth image having a fifth display range having a fifth center position which corresponds to the second center position.

10. A method of operating an information processing apparatus including instructions, the method comprising:
(a) causing a processor to execute the instructions to operate with a display device to display a first image associated with an observation target object, the first image having:
  (i) a first zoom magnification; and
  (ii) a first display range having a first center position;
(b) causing the processor to execute the instructions to operate with an input device to enable a user to change the first zoom magnification by selecting a first position of the displayed first image, wherein coordinates of the selected first position are different than those of the first center position;
(c) in response to the first position being selected by the user, causing the processor to execute the instructions to operate with the display device to display a second image associated with the observation target image, the second image having:
  (i) a second zoom magnification which is different from the first zoom magnification; and
  (ii) a second display range having a second center position which is different from the first center position, wherein the second center position is based on the coordinates of the first position selected by the user using the input device, and the second center position is closer to the first position than the first center position;
(d) upon receiving a zoom-in instruction, causing the processor to change display ranges of images at respective resolutions so that the coordinates of the selected first position are coincided with those of a center position of the display range at a target resolution, the second image being a portion of the first image and the second display range being smaller than the first display range; and
(e) before the second image is displayed, displaying a third image having a third zoom magnification which is different from the first zoom magnification and the second zoom magnification and a third display range having a third center position which is different from the first center position and the second center position, wherein the displayed third image includes a third position which corresponds to the selected first position of the first image; and a first distance between the third position and the third center position is smaller than a second distance between the selected first position and the first center position.

11. The method of claim 10, wherein the observation target object includes a section of biological tissue.

12. The method of claim 10, wherein the displayed first image is observed by a microscope.

13. The method of claim 10, which includes causing the processor to execute the instructions to operate with the input device to enable the user to select the first position of the displayed first image using a displayed cursor pointer.

14. The method of claim 13, wherein when the first position is selected, a second position of the displayed cursor pointer corresponds to the selected first position.

15. The method of claim 13, which includes, in response to the first position being selected, causing the processor to execute the instructions to operate with the display device to display the cursor pointer at the second center position.

16. The method of claim 10, which includes causing the processor to execute the instructions to operate with the display device to display a cursor pointer at the third position.

17. The method of claim 10, which includes:
(a) the information processing apparatus operating using a first mode; and
(b) causing the processor to execute the instructions to operate with the input device to:
    (i) enable the user to change the operation of the information processing apparatus from the first mode to a second, different mode; and
    (ii) in response to the user changing the operation of the information processing apparatus to the second, different mode, and in response to the position being selected, display a fourth image associated with the observation target image, the fourth image having:
        (A) a fourth zoom magnification which is different from the first zoom magnification; and
        (B) a fourth display range having a fourth center position which corresponds to the first center position.

18. The method of claim 10, which includes:
(a) causing the processor to execute the instructions to operate with the input device to, after the second image is displayed, enable the user to change the second zoom magnification by zooming out; and
(b) in response to the to second zoom magnification being changed by zooming out, causing the processor to execute the instructions to operate with the display device to display a fifth image having a fifth display range having a fifth center position which corresponds to the second center position.

19. A non-transitory computer-readable medium storing instructions structured to cause an information processing apparatus to:
(a) display a first image associated with an observation target object, the first image having:
    (i) a first zoom magnification; and
    (iii) a first display range having a first center position;
(b) enable a user to change the first zoom magnification by selecting a first position of the displayed first image, wherein coordinates of the selected first position are different than those of the first center position; and
(c) in response to the position being selected by the user, display a second image associated with the observation target image, the second image having:
    (i) a second zoom magnification which is different from the first zoom magnification; and
    (ii) a second display range having a second center position which is different from the first center position, wherein the second center position is based on the coordinates of the first position selected by the user using the input device, and the second center position is closer to the first position than the first center position;
(d) upon receiving a zoom-in instruction, change display ranges of images at respective resolutions so that the coordinates of the selected first position are coincided with those of a center position of the display range at a target resolution, the second image being a portion of the first image and the second display range being smaller than the first display range; and
(e) before the second image is displayed, display a third image having a third zoom magnification which is different from the first zoom magnification and the second zoom magnification and a third display range having a third center position which is different from the first center position and the second center position, wherein the displayed third image includes a third position which corresponds to the selected first position of the first image; and a first distance between the third position and the third center position is smaller than a second distance between the selected first position and the first center position.

20. The information processing apparatus of claim 1, wherein coordinates of the second center position coincide with the selected first position.

21. The information processing apparatus of claim 1, wherein the instructions, when executed by the processor, cause the processor to:
display a plurality of images between the first image and the second image, each of the plurality of images having a center position closer to the selected first position than a previous image.

* * * * *